(12) United States Patent
Sasaki

(10) Patent No.: US 12,429,849 B2
(45) Date of Patent: Sep. 30, 2025

(54) CONTROL DEVICE, CONTROL METHOD, AND NON-TRANSITORY COMPUTER READABLE STORAGE MEDIUM

(71) Applicant: Yokogawa Electric Corporation, Tokyo (JP)

(72) Inventor: Takashi Sasaki, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 600 days.

(21) Appl. No.: 17/871,438

(22) Filed: Jul. 22, 2022

(65) Prior Publication Data

US 2023/0056320 A1 Feb. 23, 2023

(30) Foreign Application Priority Data

Aug. 20, 2021 (JP) ................................. 2021-135000

(51) Int. Cl.
*G05B 19/4155* (2006.01)

(52) U.S. Cl.
CPC ............ *G05B 19/4155* (2013.01); *G05B 2219/50333* (2013.01)

(58) Field of Classification Search
None
See application file for complete search history.

(56) References Cited

U.S. PATENT DOCUMENTS

| 5,007,582 | A | * | 4/1991 | Morii | ............... | F28F 27/00 |
| | | | | | | 237/67 |
| 2003/0102383 | A1 | * | 6/2003 | Nanno | ............. | G05B 13/042 |
| | | | | | | 236/78 D |
| 2006/0167570 | A1 | | 7/2006 | Francis | | |

FOREIGN PATENT DOCUMENTS

| JP | S5122151 | | 7/1976 |
| JP | H01278596 | A | 11/1989 |
| JP | 2002108411 | A | 4/2002 |
| JP | 2004-172253 | A | 6/2004 |
| JP | 2012190344 | A | 10/2012 |
| JP | 2014164463 | A | 9/2014 |

OTHER PUBLICATIONS

Japanese Office Action (JPOA) dated Apr. 16, 2024 for Japanese Patent Application No. 2021-135000; English machine trasnlation.
Yueling Chen et al: "Analytical design of a generalised predictor-based control scheme for low-order integrating and unstable systems with long time delay", IET Control Theory and Applications, The Institution of Engineering and Technology, GB, vol. 10, No. 8, May 31, 2016 (May 31, 2016), pp. 884-893; Cited in European Search Report issued in European Patent Application No. 22190553.2 on Jan. 17, 2023.

* cited by examiner

*Primary Examiner* — Sean Shechtman
(74) *Attorney, Agent, or Firm* — RANKIN, HILL & CLARK LLP

(57) ABSTRACT

A control device is for a heating process which is a process of heating a target and does not include a cooling mechanism. The control device includes a controller configured to control a manipulation amount of the heating process such that a temperature of the target converges at a target temperature within a predetermined settling time without exceeding the target temperature based on a control scheme of modeling the heating process as a process including a dead time, a first-order lag, and an integration element and controlling the heating process by finite time settling control.

20 Claims, 12 Drawing Sheets

ACTUAL PROCESS:GAIN=0.003、DEAD TIME=15(s)、TIME CONSTANT=30(s)
FINITE TIME SETTLING CONTROL PARAMETERS:SETTLING TIME=500(s)、PROCESS GAIN=0.006、DEAD TIME=30(sec)、TIME CONSTANT=60(sec)
MANIPULATION AMOUNT CONSTRAINTS:0≦Wn≦100(%)

CONTROL DEVICE, CONTROL METHOD, AND NON-TRANSITORY COMPUTER READABLE STORAGE MEDIUM

BACKGROUND

Field of the Invention

The present invention relates to a control device, a control method, and a non-transitory computer readable storage medium.

Priority is claimed on Japanese Patent Application No. 2021-135000, filed on Aug. 20, 2021, the contents of which are incorporated herein by reference.

Description of Related Art

Some heating processes of heating targets do not include cooling mechanisms as in heating processes of heating targets with saturated steam. In such heating processes, it is necessary to control temperatures of targets such that the temperatures reach target temperatures within target times without overshooting (without the temperatures of targets exceeding the target temperatures) in some cases. In the related art, in such heating processes, feedback control by a proportional-integral controller (PI control) or a proportional-integral-differential controller (PID controller) was performed (see for example, Japanese Unexamined Patent Application Publication No. 2004-172253).

In the control methods of the related art, however, temperatures of targets may be overshot in some cases when parameters (a process gain, a dead time, and a time constant) of temperature processes which are control targets are changed despite appropriate tuning of control parameters.

SUMMARY

A control device is for a heating process which is a process of heating a target and does not include a cooling mechanism. The control device may include a controller configured to control a manipulation amount of the heating process such that a temperature of the target converges at a target temperature within a predetermined settling time without exceeding the target temperature based on a control scheme of modeling the heating process as a process including a dead time, a first-order lag, and an integration element and controlling the heating process by finite time settling control.

Further features and aspects of the present disclosure will become apparent from the following detailed description of exemplary embodiments with reference to the attached drawings.

DETAILED DESCRIPTION

Figure 1:
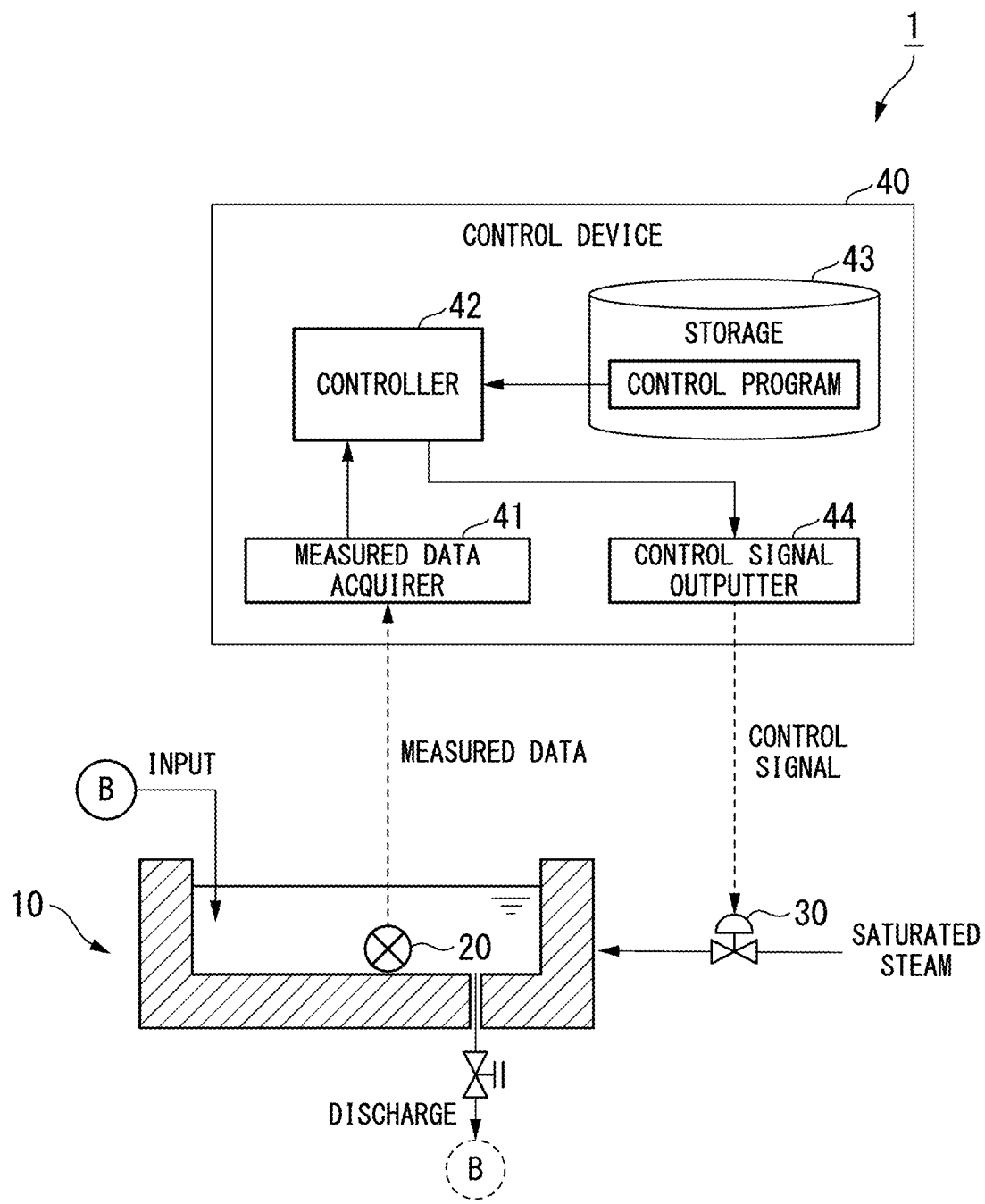
FIG. 1 is a diagram illustrating an exemplary configuration of a control system according to an embodiment.

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide a control device, a control method, and a non-transitory computer readable storage medium capable of performing control such that a temperature of a target reaches a target temperature within a target time without overshooting even when parameters of a heating process which does not include a cooling mechanism are changed.

Hereinafter, a control device, a control method, and a non-transitory computer readable storage medium according to an embodiment of the present invention will be described with reference to the drawings. Hereinafter, an overview of the embodiment of the present invention will be first described. Then, details of the embodiment of the present invention will be described.

Overview

The embodiment of the present invention is an embodiment in which control can be performed such that a temperature of a target reaches a target temperature within a target time without overshooting even when parameters of a heating process which does not include a cooling mechanism are changed. For example, even when a process gain, a dead time, and a time constant are changed in a heating process which does not include a cooling mechanism as in a heating process of heating a target with saturated steam, control can be performed such that a temperature of the target reaches a target temperature within a target time without overshooting.

In general, in a control scheme for the heating process, the following items are required in some cases from the viewpoint of cost or efficiency:

(1) a temperature of a target reaches a target temperature without overshooting using only a heating mechanism since there is no cooling mechanism for the target;

(2) in order to save a saturated steam amount, the temperature of the target reaches the target temperature at a timing which is as late as possible within the target time; and (3) there are upper and lower limit constraints (0 to 100%) in the degree of opening of a valve adjusting the saturated steam amount.

In the control scheme of the related art, however, when parameters (in particular, a process gain, a dead time, and a time constant) of a control target process are changed, countermeasures against the change cannot be taken and a temperature of a target may be overshot in some cases even if control parameters can be appropriately tuned. To inhibit the overshooting, it is conceivable to predict a timing at which the temperature of the target reaches the target temperature. However, it is difficult to obtain such a predicted model theoretically and by simulation in the present circumstances. Accordingly, in order to inhibit the overshooting in the present circumstances, early control with time to spare is required. As a result, there was a risk of a greater saturated steam amount than necessary being consumed.

In the embodiment of the present invention, a control scheme of performing control by finite time settling control by modeling a heating process which is a process of heating a target and does not include a cooling mechanism as a process including a dead time, a first-order lag, and an integration element is prepared. Based on the control scheme, a manipulation amount of the heating process is controlled such that a temperature of the target converges at the target temperature within a predetermined settling time without exceeding the target temperature. Accordingly, even when the parameters of the heating process which does not include the cooling mechanism are changed, control can be performed such that the temperature of the target reaches the target temperature within the target time without overshooting.

Embodiment

FIG. 1 is a diagram illustrating an exemplary configuration of a control system 1 according to an embodiment. The control system 1 includes, for example, a tray 10, a temperature sensor 20, a valve 30, and a control device 40. The tray 10 retains a target B which is a hating target. The temperature sensor 20 measures a temperature of the target B retained in the tray 10. The valve 30 is a valve that adjusts a saturated steam amount to be supplied to the tray 10. The control device 40 is connected to the temperature sensor 20 and the valve 30 in a communicable manner.

The control device 40 includes a central processing unit (CPU), a memory, and an auxiliary storage device connected via a bus and executes a program. The control device 40 executes a program to function as a device that includes a measured data acquirer 41, a controller 42, a storage 43, and a control signal outputter 44. Some or all of the functions of the control device 40 may be realized using hardware such as an application specific integrated circuit (ASIC), a programmable logic device (PLD), a field programmable gate array (FPGA), or the like. The program may be recorded on a computer-readable cording medium. The computer-readable recording medium is a storage device such as a portable medium such as a flexible disk, a magneto-optical disc, a ROM, or a CD-ROM or a hard disk embedded in a computer system. The program may be transmitted via an electrical communication line.

The measured data acquirer 41 includes, for example, a communication interface and acquires measured data of a temperature of the target B from the temperature sensor 20. The measured data acquirer 41 outputs the acquired measured data to the controller 42.

The controller 42 adjusts a saturated steam amount to be supplied to the inside of the tray 10 so that the temperature of the target B reaches a predetermined target temperature within a predetermined time by feedback control in accordance with the temperature of the target B. More specifically, the controller 42 controls the degree of opening of the valve 30 such that the temperature of the target B reaches the target temperature within the predetermined time without overshooting by executing a control program that realizes finite time settling control for the heating process. The controller 42 outputs a control signal for controlling the degree of opening of the valve 30 determined by a control process of each control period to the control signal outputter 44 at any time.

The storage 43 is configured using a storage device such as a magnetic hard disk device or a semiconductor storage device. The storage 43 stores the control program. The storage 43 may be used as a storage region of information such as temperature measurement data or a control signal other than the control program.

The control signal outputter 44 outputs the control signal output from the controller 42 to the valve 30. When the control signal is received from the control signal outputter 44, the valve 30 changes its own degree of opening to the degree of opening of which it is notified by the control signal.

In this way, the control device 40 according to the embodiment can cause the temperature of the target B to reach a predetermined target temperature within a predetermined time without overshooting by adjusting the degree of opening of the valve 30 by the finite time settling control for feeding a temperature of the valve 30 back. Hereinafter, the details of the finite time settling control performed by the control device 40 will be described.

Figure 2:
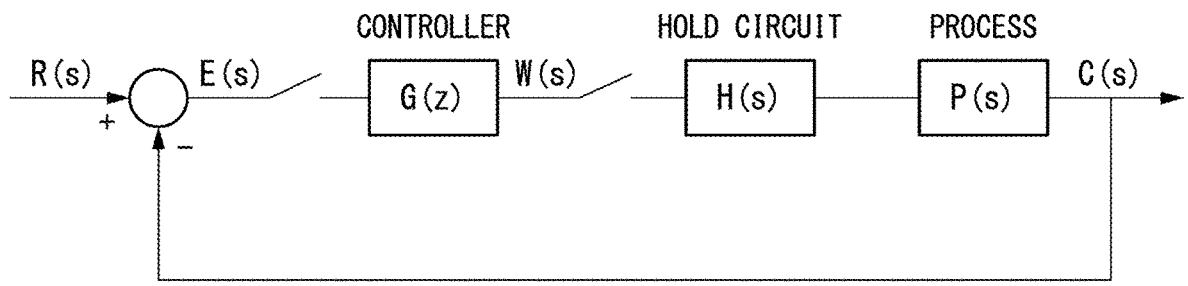
FIG. 2 is a diagram illustrating a specific example of a system configuration of a process modeled with a transfer function that has a dead time, a first-order lag element, and an integration element.

FIG. 2 is a diagram illustrating a specific example of a system configuration of a process modeled with a transfer function that has a dead time, a first-order lag element, and an integration element. Here, G(z) indicates a controller that inputs a deviation E(s) between a set value R(s) of a control target and a control amount C(s) and outputs a manipulation amount W(s). H(s) indicates a hold circuit that holds the manipulation amount W(s) that is an output of the controller G(z) for a predetermined time (a sampling period) and inputs the manipulation amount W(s) into a process P(s). In this case, for example, the transfer function of the hold circuit H(s) and the process P(s) is expressed as in Expressions (1) and (2).

[Expression 1]

$$H(s) = \frac{1 - e^{-T_s}}{s} \quad (1)$$

[Expression 2]

$$P(s) = \frac{Ke^{-Ls}}{(1+T_0s)s} \quad (2)$$

In Expressions (1) and (2), T indicates a sampling period, $T_0$ indicates a time constant, L indicates a dead time, K indicates a process gain, and L=mT (where m is a natural number or 0) is assumed. When dead time+first-order lag+integration element is set as a control target process and a sample value is controlled, a control calculation expression of the finite time settling control in which a control amount converges at a target value within any designated settling time (an integral multiple of the sampling period (=n×T)) can be derived. First, Expression (5) is obtained by modifying Expression (3) indicating the system configuration of FIG. 2 to Expression (4).

[Expression 3]

$$-HP(s)G(z)C(s) + HP(s)G(z)R(s) = C(s) \quad (3)$$

[Expression 4]

$$HP(s)G(z)R(s) = (1 + HP(s)G(z))C(s) \quad (4)$$

[Expression 5]

$$C(s) = \frac{HP(s)G(z)}{1+HP(s)G(z)}R(s) \quad (5)$$

Figure 3:
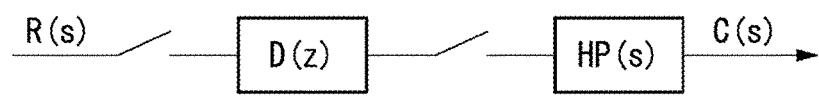
FIG. 3 is a first diagram illustrating an open loop configuration of a target process.

Accordingly, when D(z) is defined as in Expression (6), the system configuration of FIG. 2 can be rewritten as an open loop configuration of FIG. 3.

[Expression 6]

$$D(z) = \frac{G(z)}{1+HP(s)G(z)}R(s) \quad (6)$$

Figure 4:
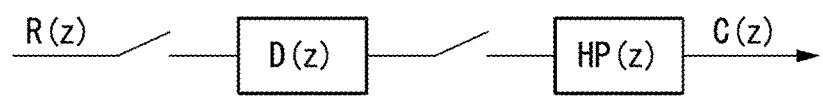
FIG. 4 is a second diagram illustrating the open loop configuration of the target process.

Further, when Z transformation of Expressions (7) to (9) is performed on the open loop configuration of FIG. 3, the open loop configuration of FIG. 3 is converted into an open loop configuration of FIG. 4.

[Expression 7]

$$\begin{aligned} HP(z) &= Z\left[\frac{1-e^{-Ts}}{s} \cdot \frac{Ke^{-Ls}}{(1+T_0s)s}\right] \\ &= K(1-z^{-1})z^{-m} \cdot Z\left[\frac{1}{s^2(1+T_0s)}\right] \\ &= K(1-z^{-1})z^{-m} \cdot Z\left[\frac{1}{s^2} - \frac{T_0}{s} + \frac{T_0}{s+T_0^{-1}}\right] \\ &= K(1-z^{-1})z^{-m}\left[\frac{Tz^{-1}}{(1+z^{-1})^2} - \frac{T_0}{1-z^{-1}} + \frac{T_0}{1-e^{-T/T_0}z^{-1}}\right] \\ &= KT_0z^{-(m+1)}\frac{b_0+b_1z^{-1}}{(1-z^{-1})(1-\alpha z^{-1})} \\ &= \frac{P_N(z)}{P_D(z)} \end{aligned} \quad (7)$$

[Expression 8]

$$P_N(z) = KT_0z^{-(m+1)}(b_0+b_1z^{-1}) \quad (8)$$

[Expression 9]

$$P_D(z) = (1-z^{-1})(1-\alpha z^{-1}) \text{ where, } \alpha = e^{-T/T_0},$$
$$\beta = \frac{T}{T_0}, b_0 = \alpha+\beta-1, b_1 = 1-\alpha\beta-\alpha \quad (9)$$

In FIG. 4, necessary and sufficient conditions for finite setting of a control amount C(z) to a settling time (=(k+m+1)T) (where k is any natural number) in a change in a set value of the target temperature are that D(z)HP(z) is expressed as a finite polynomial of $z_{-1}$ and converges at 1 as z→1 by a theorem of a final value. That is, for $a_1, a_2, \ldots, a_{k-1}, A_0$, necessary and sufficient conditions are that Expressions (10) and (11) are satisfied, and Expression (12) is obtained with Expressions (10) and (11).

[Expression 10]

$$D(z) = A_0 P_D(z)\{1+a_1z^{-1}+a_2z^{-2}+\ldots+a_{k-1}z^{-(k-1)}\} \quad (10)$$

[Expression 11]

$$\lim_{z\to 1} D(z)HP(z) = 1 \quad (11)$$

[Expression 12]

$$A_0 = \frac{1}{KT(1-\alpha)(1+a_1+a_2+\ldots+a_{k-1})} \quad (12)$$

Further, when Expression (13) is obtained with Expressions (12) and (10), G(z) is expressed as in Expression (14).

[Expression 13]

$$D(z) = A_0(1-z^{-1})(1-\alpha z^{-1})\left\{1+\sum_{i=1}^{k-1}a_iz^{-i}\right\} \quad (13)$$

[Expression 14]

$$\begin{aligned} G(z) &= \frac{D(z)}{1-HP(z)D(z)} \\ &= \frac{A_0(1-z^{-1})(1-\alpha z^{-1})\left\{1+\sum_{i=1}^{k-1}a_iz^{-i}\right\}}{1-KT_0z^{-(m+1)}\frac{b_0+b_1z^{-1}}{(1-z^{-1})(1-\alpha z^{-1})}A_0(1-z^{-1})(1-\alpha z^{-1})\left\{1+\sum_{i=1}^{k-1}a_iz^{-i}\right\}} \\ &= \frac{A_0(1-z^{-1})(1-\alpha z^{-1})\left\{1+\sum_{i=1}^{k-1}a_iz^{-i}\right\}}{1-KA_0T_0z^{-(m+1)}(b_0+b_1z^{-1})\left\{1+\sum_{i=1}^{k-1}a_iz^{-i}\right\}} \end{aligned} \quad (14)$$

Here, when $a_i = \alpha^i$ ($1 \leq i \leq k-1$) T is a sampling period, and $T_0$ is a time constant of a control target process, Expressions (15) and (16) are obtained with regard to Expression (14).

[Expression 15]

$$1 + \sum_{i=1}^{k-1} a_i z^{-i} = 1 + \sum_{i=1}^{k-1} \alpha^i z^{-i} = \sum_{i=0}^{k-1} \alpha^i z^{-i} = \frac{1 - \alpha^k z^{-k}}{1 - \alpha z^{-1}} \qquad (15)$$

[Expression 16]

$$A = 1 + \sum_{i=1}^{k} a_i = \sum_{i=0}^{k} \alpha^i = \frac{1 - \alpha^k}{1 - \alpha} \qquad (16)$$

Accordingly, $A_0$ is expressed as in Expression (17) from Expressions (16) and (12) and G(z) is expressed as in Expression (18) from Expressions (17) and (14).

[Expression 17]

$$A_0 = \frac{1}{KT(1-\alpha)(1 + a_1 + a_2 + \ldots + a_{k-1})} = \frac{1}{KT(1-\alpha^k)} \qquad (17)$$

[Expression 18]

$$G(z) = \frac{\frac{1}{KT(1-\alpha^k)}(1 - z^{-1})(1 - \alpha^k z^{-k})}{1 - KT_0 \frac{1}{KT(1-\alpha^k)} z^{-(m+1)}(b_0 + b_1 z^{-1})\frac{1 - \alpha^k z^{-k}}{1 - \alpha z^{-1}}} \qquad (18)$$

$$= \frac{1}{KT(1-\alpha^k)} \left\{ \frac{(1 - z^{-1})(1 - \alpha z^{-1})(1 - \alpha^k z^{-k})}{1 - \alpha z^{-1} - \frac{1}{\beta(1-\alpha^k)} z^{-(m+1)}(b_0 + b_1 z^{-1})(1 - \alpha^k z^{-k})} \right\}$$

$$= \frac{1}{KT(1-\alpha^k)} \left\{ \frac{1 - (1+\alpha)z^{-1} + \alpha z^{-2} - \alpha^k z^{-k} + (1+\alpha)(\alpha^k z^{-(k+1)} - \alpha^{k+1} z^{-(k+2)})}{1 - \alpha z^{-1} - \frac{1}{\beta(1-\alpha^k)} z^{-(m+1)}(b_0 + b_1 z^{-1} - b_0 \alpha^k z^{-k} - b_1 \alpha^k z^{-(k+1)})} \right\}$$

where, $\beta = \frac{T}{T_0}$, $b_0 = \alpha + \beta - 1$, $b_1 = 1 - \alpha\beta - \alpha$, $\alpha = \exp\left(-\frac{T}{T_0}\right)$ Accordingly, the control calculation expressions are derived from Expression (18) as in Expressions (19) to (21).

[Expression 19]

$$W_n = \frac{1}{KT(1-\alpha^k)}[E_n - (1+\alpha)E_{n-1} + \alpha E_{n-2} - \alpha^k E_{n-k} + \qquad (19)$$

$$(1+\alpha)\alpha^k E_{n-(k+1)} - \alpha^{k+1} E_{n-(k+2)}] + \alpha W_{n-1} + \frac{1}{\beta(1-\alpha^k)}$$

$$\{b_0 W_{n-(m+1)} + b_1 W_{n-(m+2)} - b_0 \alpha^k W_{n-(m+k+1)} - b_1 \alpha^k W_{n-(m+k+2)}\}$$

[Expression 20]

$$W_{n-1} = \frac{1}{KT(1-\alpha^k)}[E_{n-1} - (1+\alpha)E_{n-2} + \alpha E_{n-3} - \alpha^k E_{n-(k+1)} + \qquad (20)$$

$$(1+\alpha)\alpha^k E_{n-(k+2)} - \alpha^{k+1} E_{n-(k+3)}] + \alpha W_{n-2} + \frac{1}{\beta(1-\alpha^k)}$$

$$\{b_0 W_{n-(m+2)} + b_1 W_{n-(m+3)} - b_0 \alpha^k W_{n-(m+k+2)} - b_1 \alpha^k W_{n-(m+k+3)}\}$$

[Expression 21]

$$\Delta W_n = \qquad (21)$$

$$\frac{1}{KT(1-\alpha^k)}[E_n - (2+\alpha)E_{n-1} + (1+2\alpha)E_{n-2} - \alpha E_{n-3} - \alpha^k E_{n-k} +$$

$$(2+\alpha)\alpha^k E_{n-(k+1)} - (1+2\alpha)\alpha^k E_{n-(k+2)} + \alpha^{k+1} E_{n-(k+3)}] +$$

$$\alpha \Delta W_{n-1} + \frac{1}{\beta(1-\alpha^k)}\{b_0 \Delta W_{n-(m+1)} + b_1 \Delta W_{n-(m+2)} -$$

$$b_0 \alpha^k \Delta W_{n-(m+k+1)} - b_1 \alpha^k \Delta W_{n-(m+k+2)}\}$$

Here $W_n$ indicates a manipulation amount (position type) at an n sample time and $\Delta W_n$ indicates a manipulation change amount (speed type).

Figure 5:
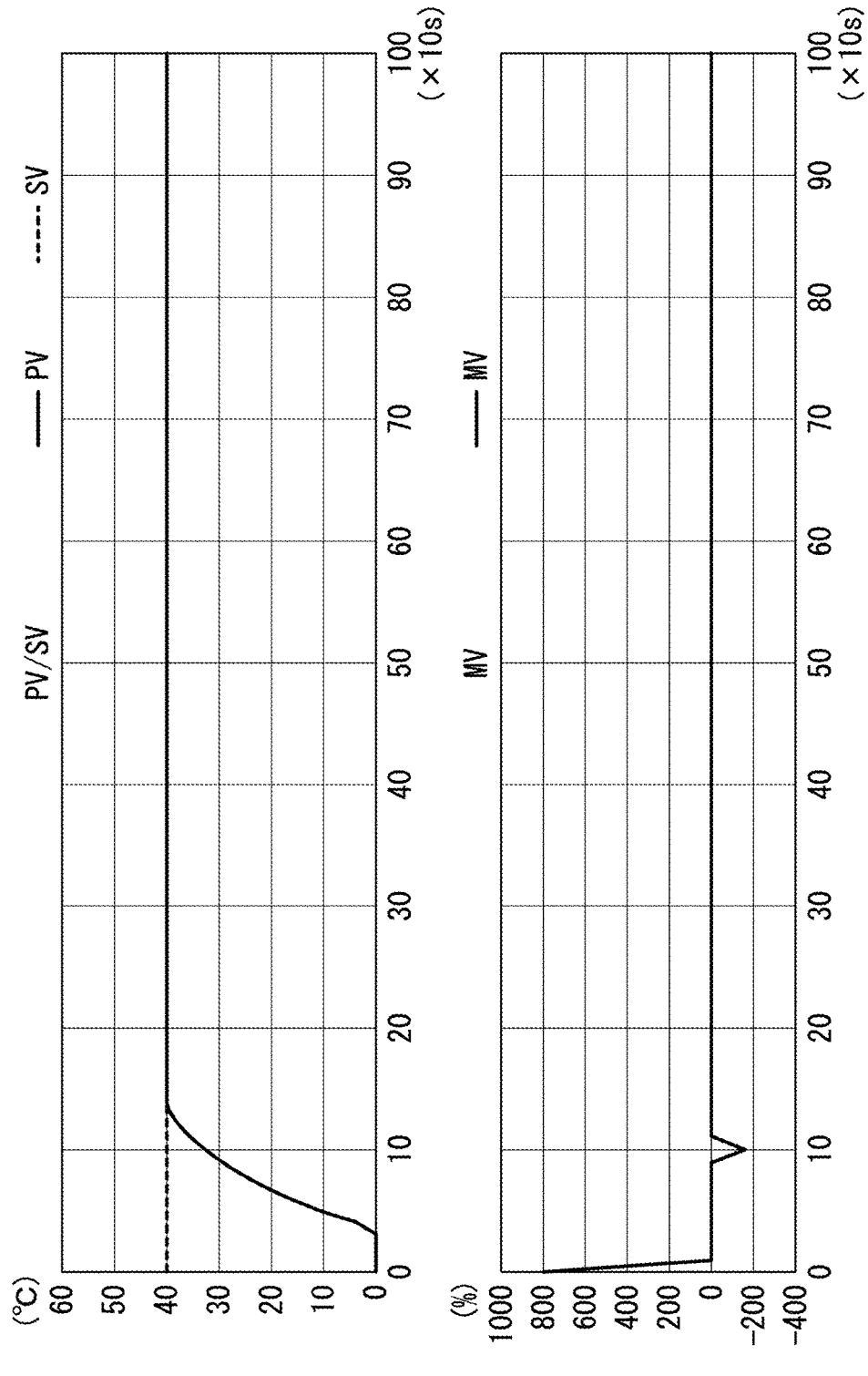
FIG. 5 is a diagram illustrating a first simulation result of a control calculation expression according to the embodiment.

FIG. 5 is a diagram illustrating a result obtained by applying control calculation expressions derived in Expressions (19) to (21) to a target process and performing a simulation. Here, a range of the control manipulation amount (a positional value) $W_n$ was calculated as $-200 \leq W_n \leq 1000$. In subsequent simulations, the sampling period was set to 10 (seconds). According to a simulation result of FIG. 5, in this case, it was found that the temperature of the target B could be set to a target temperature in 130 seconds (=settling time+dead time).

However, in the example of FIG. 5, there is a portion in which the degree of opening of the valve 30 is a negative value. Since a constraint of $0 \leq W_n \leq 100$ [%] is imposed on the degree of opening of the valve 30 which is an actual manipulation amount, the result of FIG. 5 cannot be applied to actual control as it is. Here, because the result of FIG. 5 is considered to be obtained by supplying a necessary heat quantity in a short time, the settling time is expected to be set longer so that the degree of opening of the valve 30 does not exceed 0 to 100%. Accordingly, a simulation was performed when the settling time was set to 500 seconds which is sufficiently long in a calculation expression similar to FIG. 5.

Figure 6:
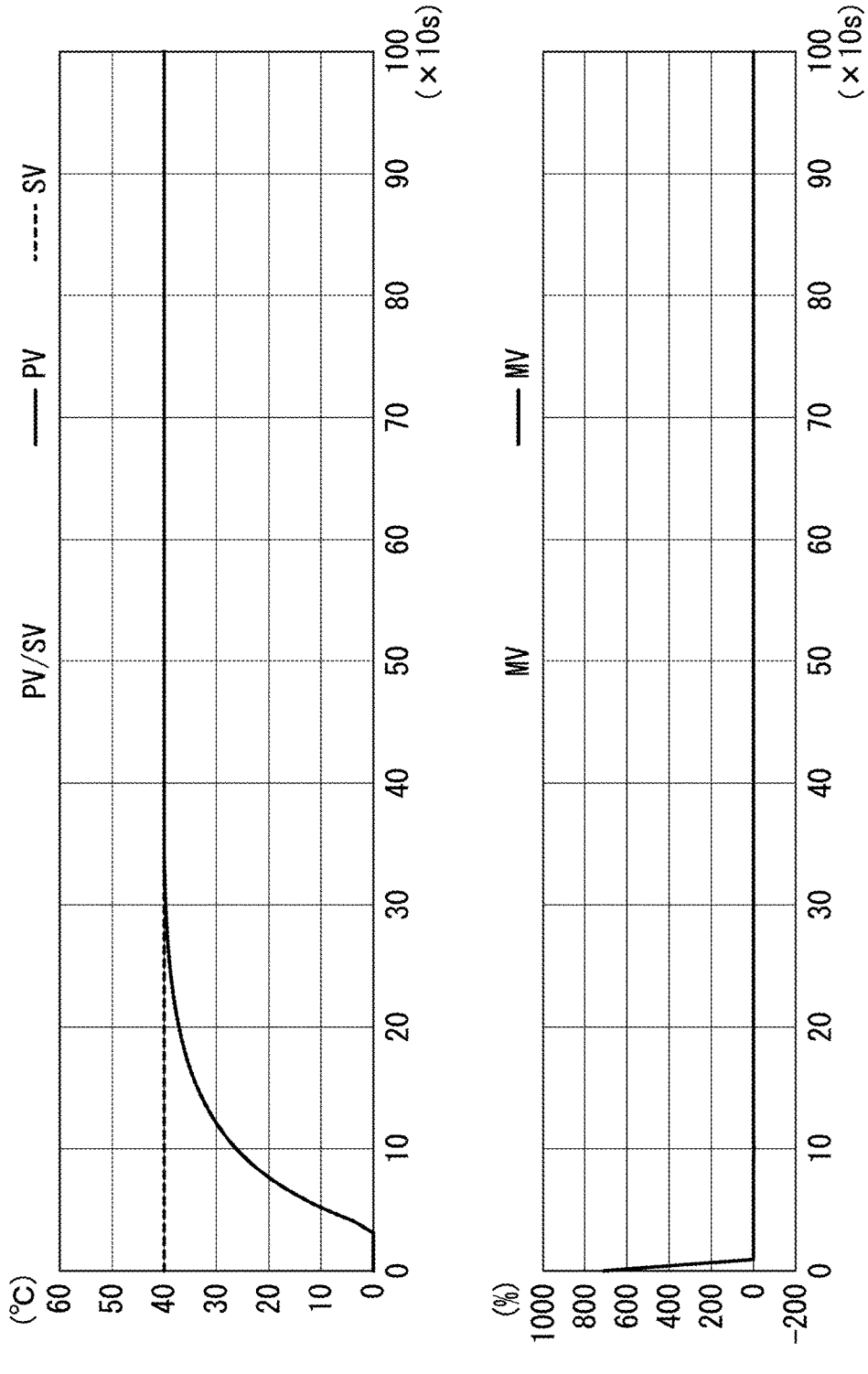
FIG. 6 is a diagram illustrating a second simulation result of the control calculation expression according to the embodiment.

FIG. 6 illustrates a simulation result when the settling time is set to 500 seconds. In this case, it was understood that manipulation amounts were all set positive values ($0 \leq W_n \leq 667\%$) and then the temperature of the target B could be set to 530 seconds of the settling time+the dead time. However, even this case, since the constraint that the upper limit of the manipulation amount is 100% is not satisfied, the following Expression (22) is incorporated into the control calculation expressions of (19) to (21) to actually realize the constraint of the upper limit of the manipulation amount.

Figure 7:
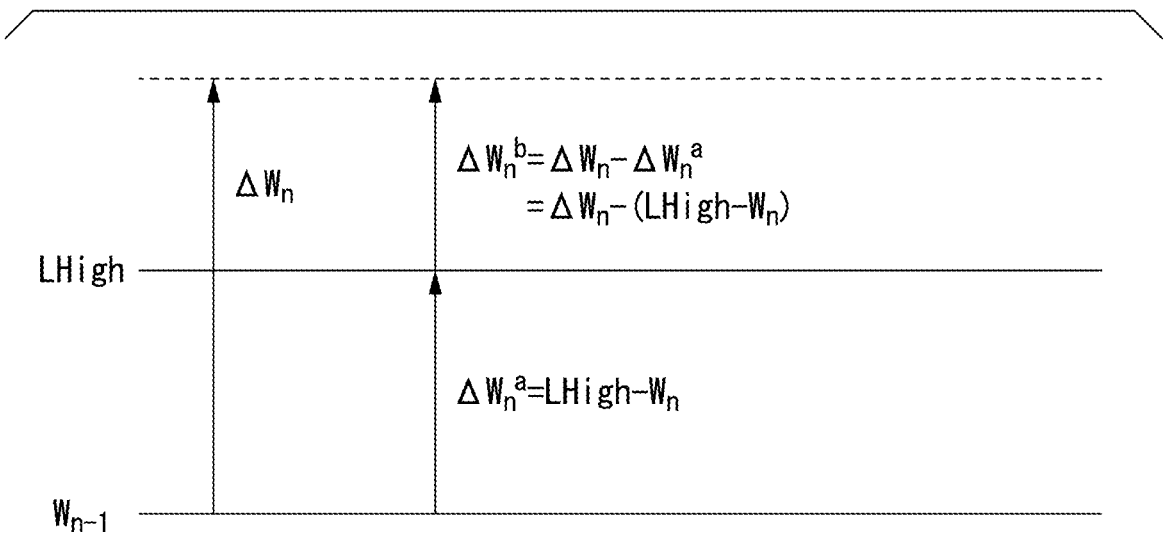
FIG. 7 is a diagram illustrating a relation between an upper limit of a manipulation amount and an actual manipulation amount.

First, when L (>0) is the upper limit of the manipulation amount (position type) and $W_n + \Delta W_n > L$, an actual manipulation amount $\Delta W_n^a$ is $\Delta W_n^a = L - W_n$. Accordingly, when an unmanipulatable portion in the change amount $\Delta W_n$ of the manipulation amount is $\Delta W_n^b$, a relation of Expression (22) is established. Further, this relation is established similarly even when L (>0) is set to a lower limit of the manipulation amount, as is clear from FIG. 7.

[Expression 22]

$$\Delta W_n^b = \Delta W_n - \Delta W_n^a = \Delta W_n - (L - W_n) \tag{22}$$

Here, $\Delta W_n = \Delta W_n^a + \Delta W_n^b$. Therefore, when this is applied to Expressions (19) to (21), Expression (23) is obtained.

[Expression 23]

$$\Delta W_n^a + \Delta W_n^b = \frac{1}{KT(1-\alpha^k)}\left[E_n - (2+\alpha)E_{n-1} + (1+2\alpha)E_{n-2} - \alpha E_{n-3} - \alpha^k E_{n-k} + (2+\alpha)\alpha^k E_{n-(k+1)} - (1+2\alpha)\alpha^k E_{n-(k+2)} + \alpha^{k+1}E_{n-(k+3)}\right] + \alpha \Delta W_{n-1} + \frac{1}{\beta(1-\alpha^k)}\left\{b_0 \Delta W_{n-(m+1)} + b_1 \Delta W_{n-(m+2)} - b_0 \alpha^k \Delta W_{n-(m+k+1)} - b_1 \alpha^k \Delta W_{n-(m+k+2)}\right\} \tag{23}$$

[Expression 24]

$$\Delta W_n^a = \frac{1}{KT(1-\alpha^k)}\left[\{E_n - KT(1-\alpha^k)\Delta W_n^b\} - (2+\alpha)E_{n-1} + (1+2\alpha)E_{n-2} - \alpha E_{n-3} - \alpha^k E_{n-k} + (2+\alpha)\alpha^k E_{n-(k+1)} - (1+2\alpha)\alpha^k E_{n-(k+2)} + \alpha^{k+1}E_{n-(k+3)}\right] + \alpha \Delta W_{n-1} + \frac{1}{\beta(1-\alpha^k)}\left\{b_0 \Delta W_{n-(m+1)} + b_1 \Delta W_{n-(m+2)} - b_0 \alpha^k \Delta W_{n-(m+k+1)} - b_1 \alpha^k \Delta W_{n-(m+k+2)}\right\} \tag{24}$$

Accordingly, when $E_n^b = E_n - KT(1-\alpha^k)\Delta W_n^b$, $\Delta W_n^a$ can be regarded as a manipulation amount of the finite time settling control (Expressions (19) to (21)) for a deviation $E_n^b$. At this time, since $W_n + \Delta W_n^a = L$, the upper or lower limit L of the manipulation amount may not be conscious. That is, by regarding the deviation as $E_n^b$ rather than actual $E_n$, the manipulation amount $\Delta W_n^a$ in which there is the constraint of the upper or lower limit can be believed to be the same as a manipulation amount in which the upper or lower limit is not taken into consideration. Accordingly, Expression (25) can be obtained from Expression (24).

[Expression 25]

$$\Delta W_n = \frac{1}{KT(1-\alpha^k)}\left[E_n - (2+\alpha)E_{n-1}^b + (1+2\alpha)E_{n-2}^b - \alpha E_{n-3}^b - \alpha^k E_{n-k}^b + (2+\alpha)\alpha^k E_{n-(k+1)}^b - (1+2\alpha)\alpha^k E_{n-(k+2)}^b + \alpha^{k+1}E_{n-(k+3)}^b\right] + \alpha \Delta W_{n-1}^a + \frac{1}{\beta(1-\alpha^k)}\left\{b_0 \Delta W_{n-(m+1)}^a + b_1 \Delta W_{n-(m+2)}^a - b_0 \alpha^k \Delta W_{n-(m+k+1)}^a - b_1 \alpha^k \Delta W_{n-(m+k+2)}^a\right\} \tag{25}$$

where, $\Delta W_n^a = LHigh - W_n$ (when $W_n + \Delta W_n > LHigh$)

$= \Delta W_n$ (when $LLow \leq W_n + \Delta W_n \leq LHigh$)

$= LLow - W_n$ (when $W_n + \Delta W_n < LLow$)

$\Delta W_n^b = \Delta W_n - (LHigh - W_n)$ (when $W_n + \Delta W_n > LHigh$)

$= 0$ (when $LLow \leq W_n + \Delta W_n \leq LHigh$)

$= \Delta W_n - (LLow - W_n)$ (when $W_n + \Delta W_n < LLow$)

$E_{n-i}^b = E_{n-i} - KT(1-\alpha^k)\Delta W_{n-i}^b$ ($1 \leq i \leq k+3$)

Figure 8:
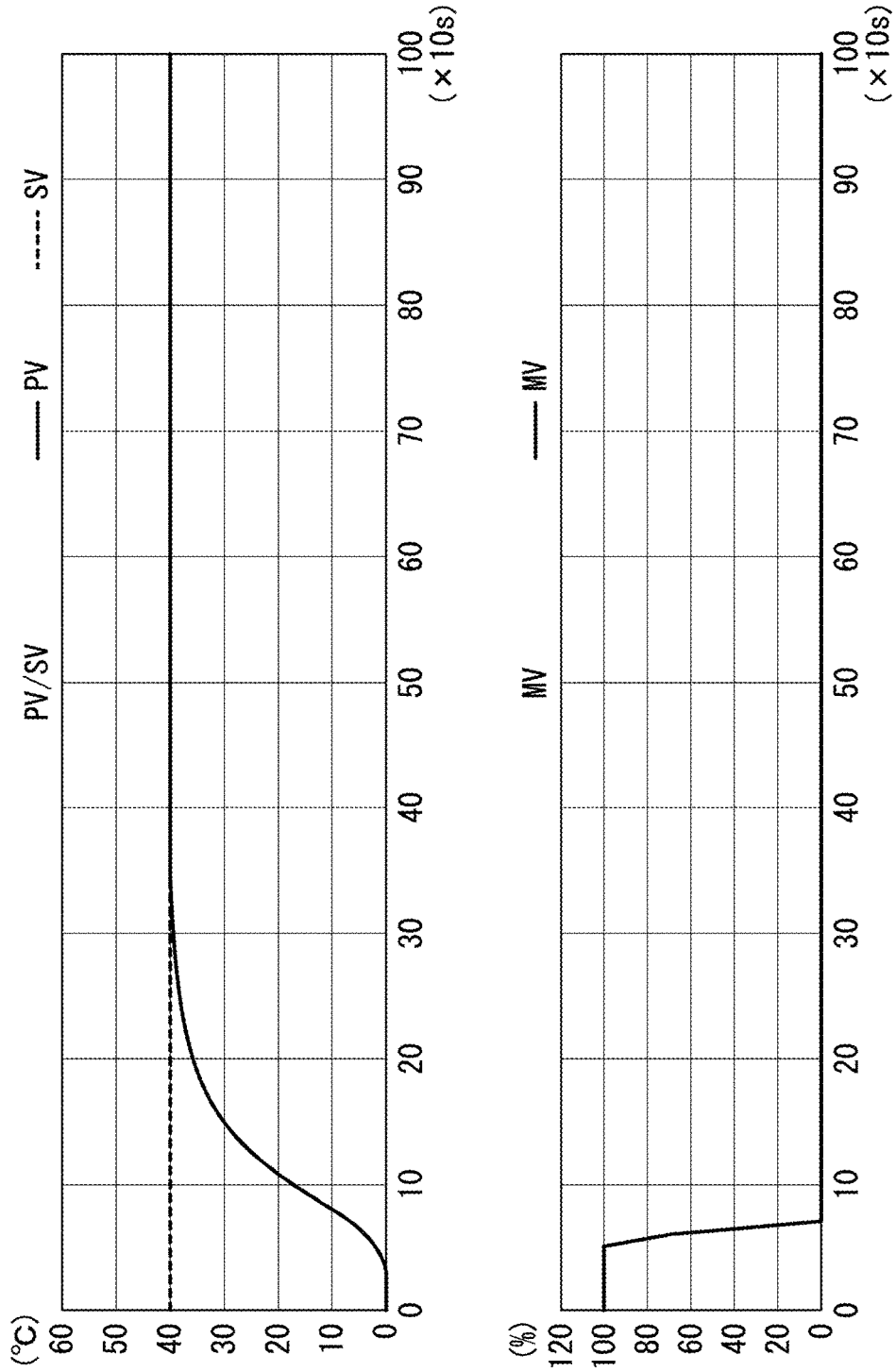
FIG. 8 is a diagram illustrating a third simulation result of the control calculation expression according to the embodiment.

FIG. 8 is a diagram illustrating a result obtained by applying control calculation expressions derived in Expression (25) to a target process and performing a simulation. Here, FIG. 8 illustrates a simulation result when process parameters of an actual process match process parameters of a process model. Specifically, a gain=0.006, a dead time=30 seconds, and a time constant=60 seconds were set as the process parameters, a range of the control manipulation amount (positional value) $W_n$ was set to $0 \leq W_n \leq 100$ [%], and a settling time was set to 500 seconds for calculation. According to the simulation result of FIG. 8, in this case, it was understood that the degree of opening of the valve 30 was kept in the range of 0 to 100% and then the temperature of the target B could be set to a target temperature for given 530 seconds (=settling time+dead time).

Figure 9:
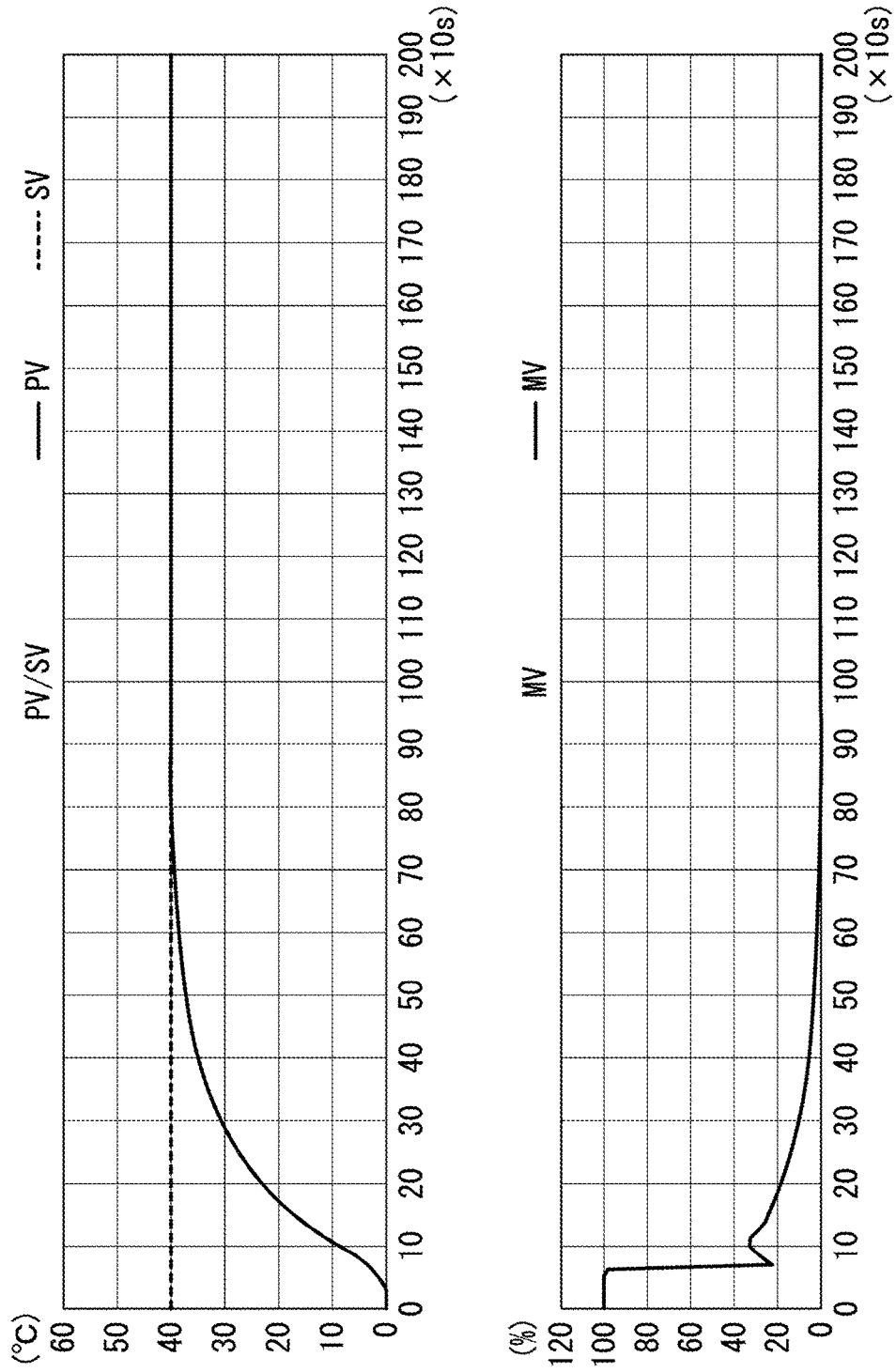
FIG. 9 is a diagram illustrating a fourth simulation result of the control calculation expression according to the embodiment.

FIG. 9 is a diagram illustrating a result obtained by applying control calculation expressions derived in Expression (25) to a target process and performing a simulation. Here, process parameters of a process model are the same as those of the case of FIG. 8 and FIG. 9 illustrates a simulation result when process parameters of an actual process are different from process parameters of a process model. Specifically, calculation was performed using 0.003 which is a half of the gain of the process model as a gain of the actual process. The other parameters and the control conditions are the same as those of FIG. 8. According to the simulation result of FIG. 9, in this case, as in the case of FIG. 8, it was found that the degree of opening of the valve 30 was controlled in the range of 0 to 100% and then the temperature of the target B could be set to a target temperature for given 530 seconds (=settling time+dead time).

According to the control scheme constructed in this way, even when the process parameters of the actual process deviate from the process parameters of the process model, the temperature of the target B can be set to a target temperature within a given finite time.

Figure 10:
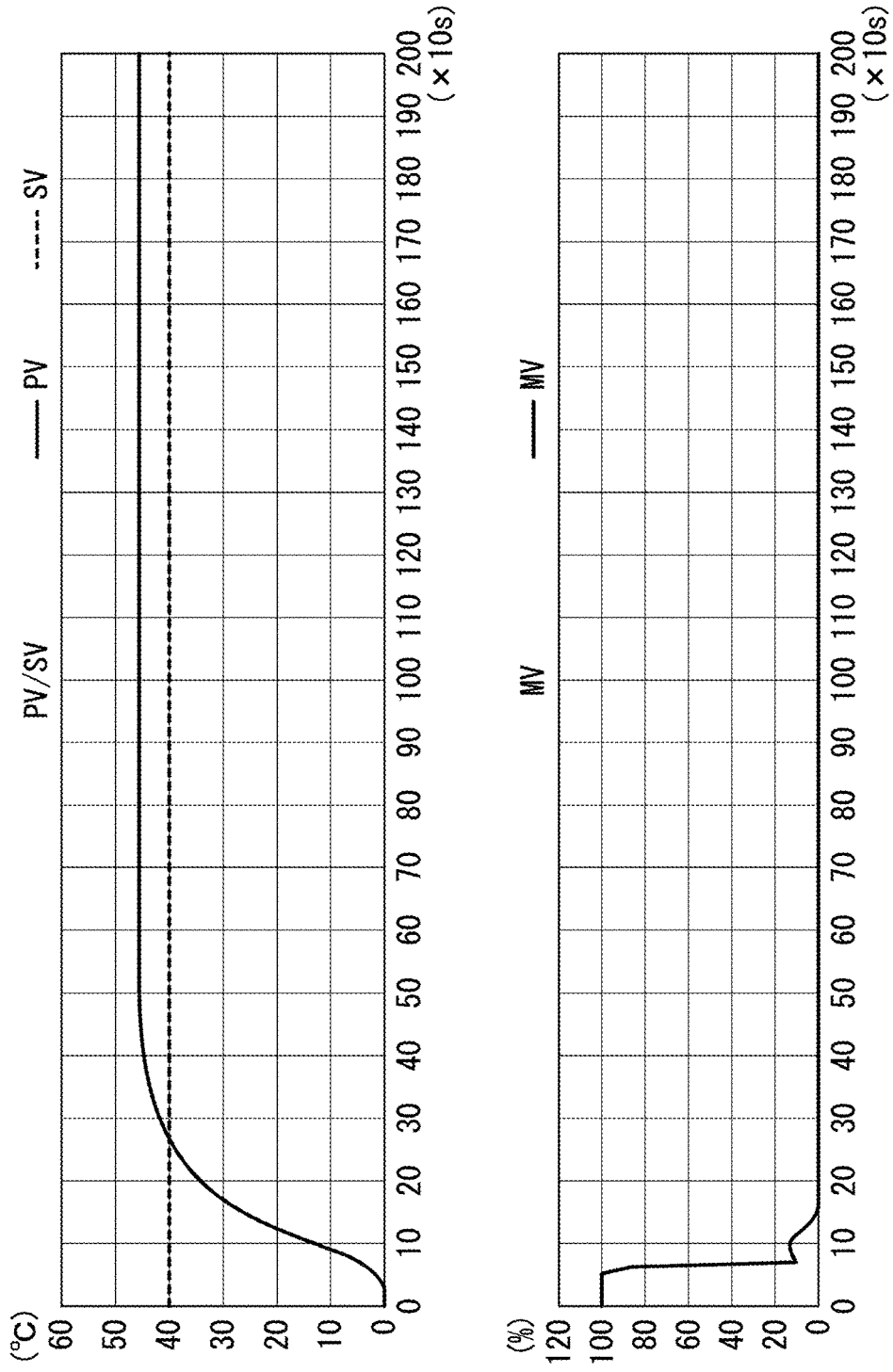
FIG. 10 is a diagram illustrating a fifth simulation result of the control calculation expression according to the embodiment.

FIG. 9 is a diagram illustrating a result obtained by applying control calculation expressions derived in Expression (25) to a target process and performing a simulation. Here, as in the example of FIG. 9, FIG. 10 illustrates a simulation result when process parameters of an actual process are different from process parameters of a process model. Specifically, calculation was performed using 90 seconds increased by 50% of the time constant of the process model from the time constant of the time constant of the actual process. The other parameters and the control conditions are the same as those of FIG. 8. According to the simulation result of FIG. 10, in this case, it was found that the temperature of the target B was set to a target temperature in a finite time and the temperature converges at a temperature higher than the target temperature. That is, in this case, overshooting occurs.

Accordingly, even when the process parameters deviate between the actual process and the process model, a correction expression for correcting a set value so that the set value of the target temperature becomes gradually close to a final target value (a constant value) in accordance with an elapsed time at which a set value of the target temperature is not normally the constant time in order for the temperature of the target B to be set to the target temperature within a predetermined time without overshooting is introduced into the control calculation expression (25). Hereinafter, the final target value of the set value of the target temperature is referred to as a "target set value." For example, a set value of the target temperature can be corrected using a quadratic curve.

Figure 11:
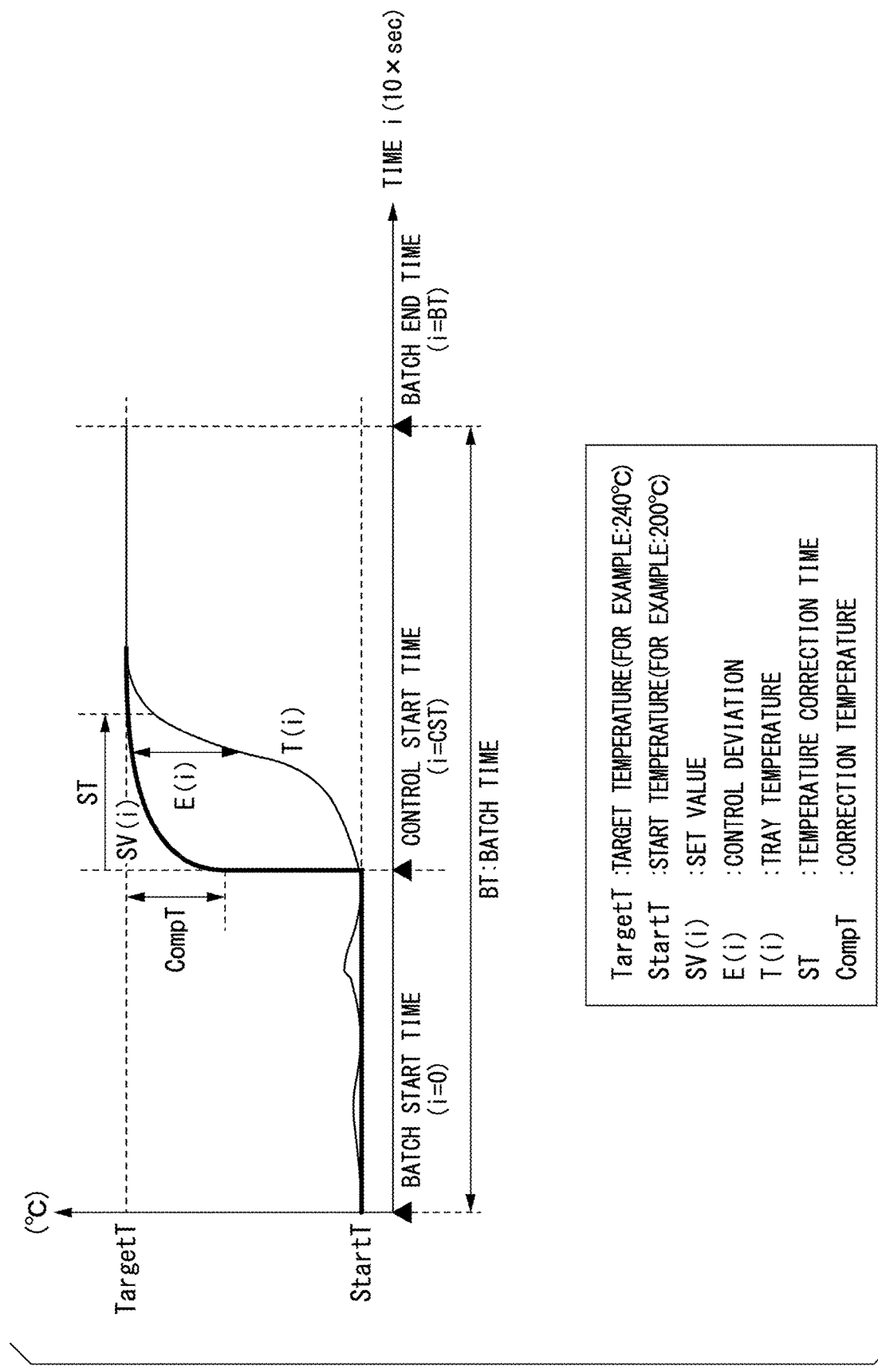
FIG. 11 is a diagram illustrating an image of correction of a set value of a target temperature.

FIG. 11 is a diagram illustrating an image of correction of a set value of a target temperature. In FIG. 11, a curve T(i) represents a change in the temperature of the target B and a curve SV(i) represents a change in the set value of the corrected target temperature. Specifically, FIG. 11 illustrates gentle correction of the set value of the target temperature to the target set value for a predetermined temperature correction time ST from a control start time (i=CST) of the heating process. Here, the corrected set value SV(i) (where i=1 to BT) is expressed as in Expression (26).

[Expression 26]

$$\begin{cases} SV(i) = StartT & (i < CST) \\ SV(i) = TargetT - CompT \cdot \left(\dfrac{i - (CST + ST)}{ST}\right)^2 & (CST \leq i \leq CST + ST) \\ SV(i) = TargetT & (CST + ST < i \leq BT) \end{cases} \quad (26)$$

In Expression (26), StartT indicates a temperature of the target B at a control start time point. TargetT indicates a target set value. BT is a time in which the heating process can be performed on the target B and is, for example, a time from supply of the target B inside the tray 10 to discharge of the target B to the outside of the tray 10 (hereinafter referred to as a "batch time"). A period determined with the batch time is an example of "a processable period." CompT indicates magnitude of a set value of a target temperature corrected for the temperature correction time ST. Here, Expression (28) is obtained by putting SV(t) as in Expression (27) in consideration of a continuous time. Expression (28) means that the corrected set value is connected to TargetT which is a target set value smoothly (that is, at a differential coefficient=0 from both sides) at a time of t=CST+ST.

[Expression 27]
$$SV(t) = TargetT - CompT \cdot \left( \frac{t - (CST + ST)}{ST} \right)^2 \quad (27)$$

[Expression 28]
$$SV(CST + ST) = TargetT \cdot \left. \frac{dSV(t)}{dt} \right|_{t=CST+ST} = 0 \quad (28)$$

Figure 12:
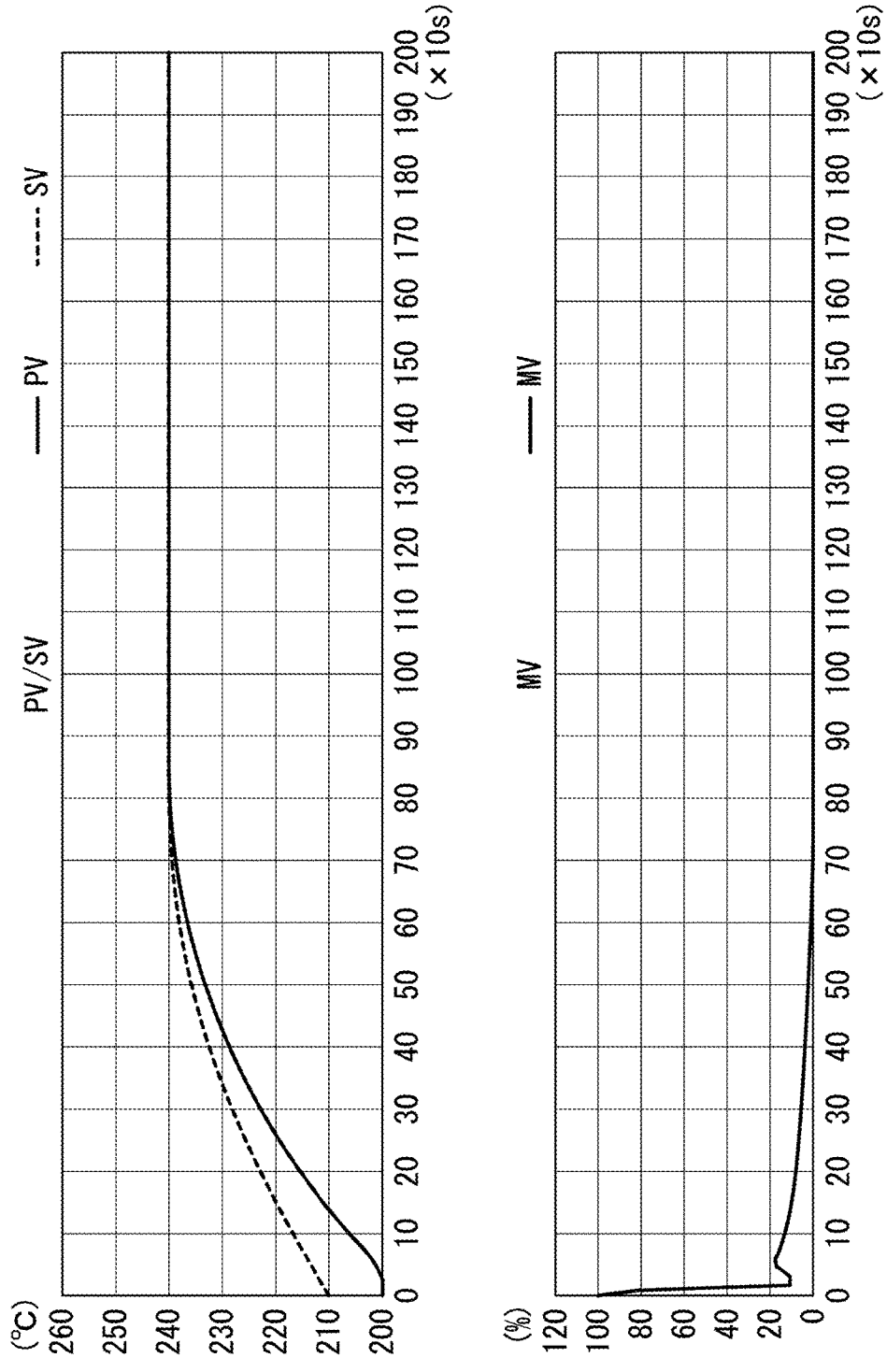
FIG. 12 is a diagram illustrating a sixth simulation result of the control calculation expression according to the embodiment.

FIG. 12 is a diagram illustrating a result obtained by applying a control calculation expression into which a correction expression for a set value is introduced to a target process and performing a simulation. Here, the correction temperature CompT=30 [° C.], the temperature correction time ST=80 [units of 10 seconds], and the control start time CST=0 are set and the parameters and the control conditions are the same as those of the example of FIG. 11. According to a simulation result of FIG. 12, unlike the case of FIG. 11, it was found that the temperature of the target B could be set to the target temperature in a finite time without overshooting.

Figure 13:
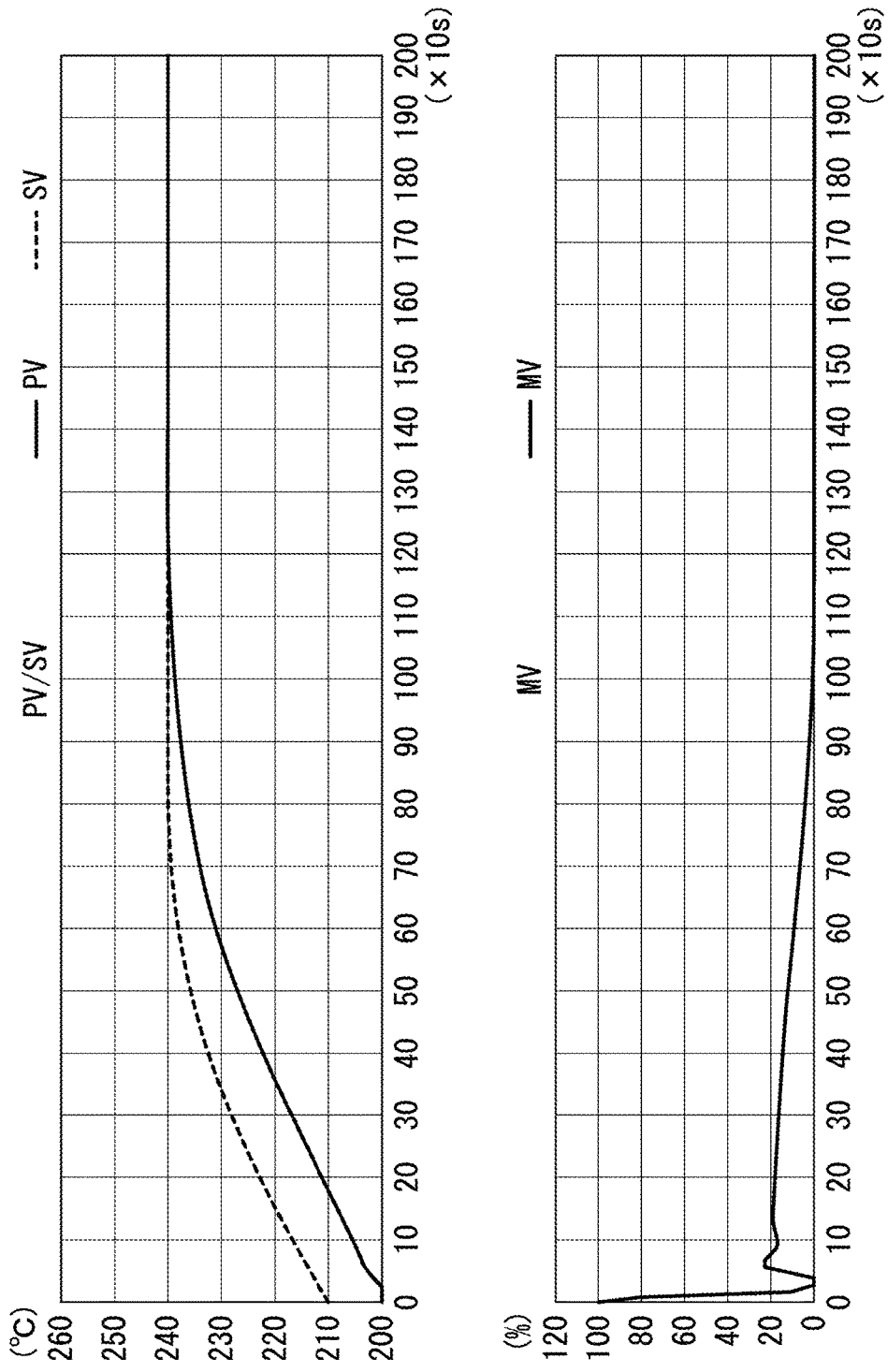
FIG. 13 is a diagram illustrating a seventh simulation result of the control calculation expression according to the embodiment.
Figure 14:
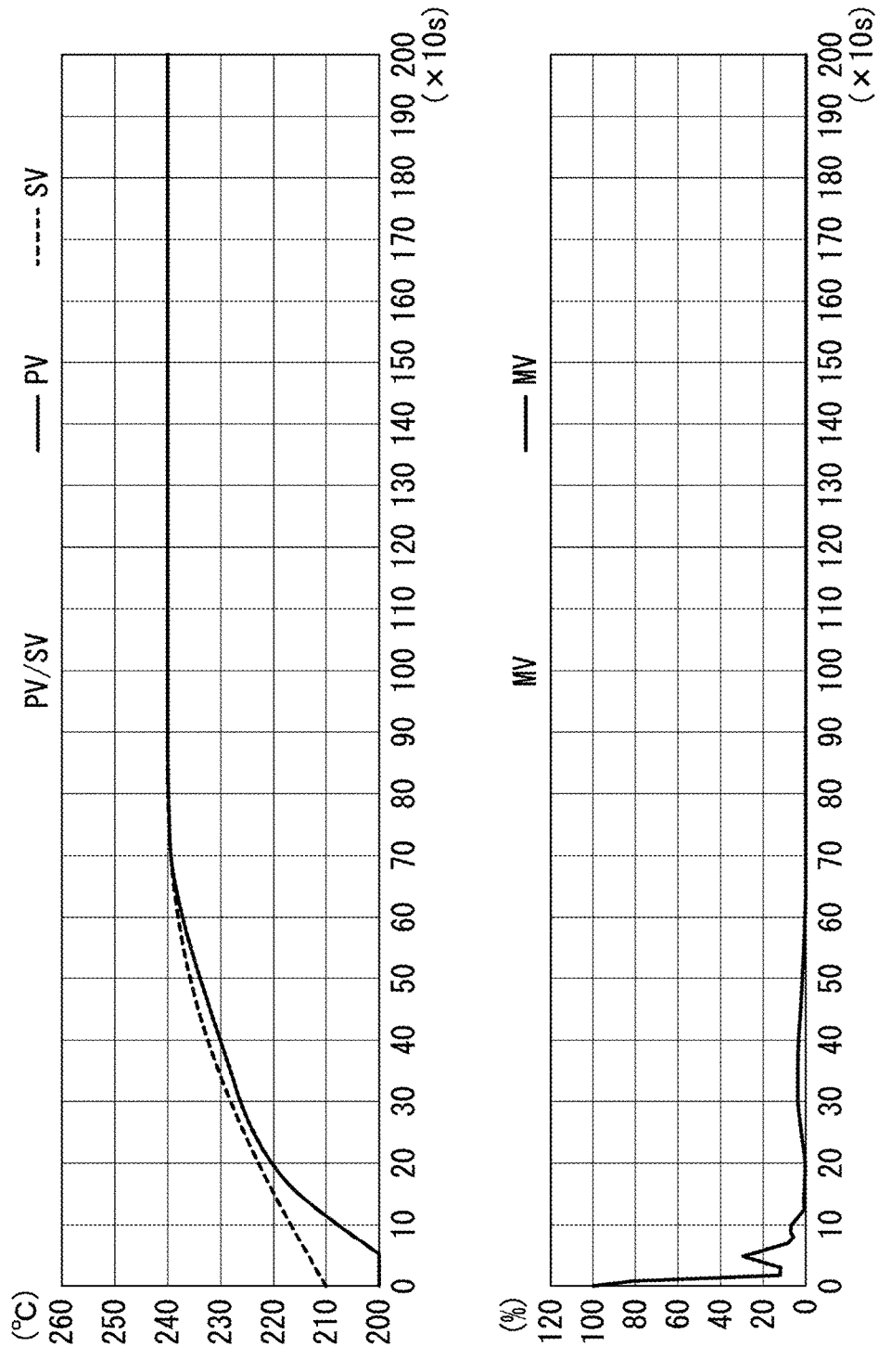
FIG. 14 is a diagram illustrating an eighth simulation result of the control calculation expression according to the embodiment.

FIGS. 13 and 14 are diagrams illustrating results obtained by applying a control calculation expression into which a correction expression for a set value is introduced to a target process and performing a simulation. FIG. 13 illustrates a simulation result when a gain, a dead time, and time constant of an actual process is decreased by 50% of the values of the process model and FIG. 14 illustrates a simulation result when a gain, a dead time, and time constant of an actual process are increased by 50% of the values of the process model. In either case, it was understood that the temperature of the target B could be set to a target temperature in a finite time without overshooting by introducing the correction expression.

From the foregoing results, according to the control calculation expression into which the correction expression is introduced, even when the process parameters of the actual process deviate from the process parameters of the process module, it can be understood that the temperature of the target B is set to the target temperature after a maximum of 1330 seconds (=a correction time of 500 seconds+a temperature correction time of 800 seconds+a dead time of 30 seconds) has passed. Accordingly, when the control starts before 1330 seconds from an end time of a preset processable time, the temperature of the target B can reach the target temperature without overshooting despite occurrence of deviation of the process parameters between the actual process and the process model.

As described above, the control device according to the embodiment is a control device for a heating process which is a process of heating a target and does not include a cooling mechanism. The control device includes a controller configured to control a manipulation amount of the heating process such that a temperature of the target converges at a target temperature within a predetermined settling time without exceeding the target temperature based on a control scheme of controlling the heating process by finite time settling control by modeling the heating process as a process including a dead time, a first-order lag, and an integration element. In this configuration, the control device according to the embodiment can set the temperature of the target B to the target temperature in a finite time while inhibiting the temperature of the target B from overshooting the temperature.

In the control device according to the embodiment, the control scheme has predetermined upper and lower limit constraints on the manipulation amount. The controller controls the manipulation amount of the heating process under the upper and lower limit constraints. In this configuration, the control device according to the embodiment can inhibit the temperature of the target B from overshooting the target temperature.

In the control device according to the embodiment, the controller corrects a set value of the target temperature so that the set value gently increases to a final target value after the control of the heating process starts. More specifically, the controller corrects the set value of the target temperature using a quadratic curve. In this configuration, the control device according to the embodiment can inhibit the temperature of the target B from overshooting the target temperature.

In the control device according to the embodiment, the controller estimates a required time until the temperature of the target converges at the target temperature based on a shape of the quadratic curve, and the settling time and the dead time which are parameters of the control scheme and starts the control of the heating process at a time which is as late as possible within a time of a predetermined processable period. In this configuration, the control device according to the embodiment can improve energy efficiency by saving saturated steam.

As described above, the control system 1 according to the embodiment can perform control such that the temperature of the target B reaches the target temperature within the target time without overshooting even when the parameters of the heating process which does not include a cooling mechanism are changed. The control method by the control system 1 in the embodiment has a higher robust property than PI control (or PID control) of the related art, and thus it is possible to more appropriately control the heating process in which saturated steam is used.

In the foregoing embodiment, the method of applying the finite time settling control to control of the heating process of heating the target B by saturated steam has been described. However, the scheme of improving the control calculation expression so that correction can be performed in a finite time while keeping the upper or lower limit constraint of the manipulation amount according to the embodiment is not limited to the case in which the target process has an integration property and can also be applied to any linear time invariant process (general dead time+first-order lag system or the like).

Supplementary Note (1) According to an aspect of the present invention, a control device for a heating process which is a process of heating a target and does not include a cooling mechanism may include a controller configured to control a manipulation amount of the heating process such that a temperature of the target converges at a target temperature within a predetermined settling time without exceeding the target temperature based on a control scheme of modeling the heating process as a process including a dead time, a first-order lag, and an integration element and controlling the heating process by finite time settling control.

(2) In the control device according to the aspect of the present invention, the control scheme may have predetermined upper and lower limit constraints on the manipulation amount. The controller may control the manipulation amount of the heating process under the upper and lower limit constraints.

(3) In the control device according to the aspect of the present invention, the controller may correct a set value of the target temperature so that the set value gently increases to a final target value after the control of the heating process starts.

(4) In the control device according to the aspect of the present invention, the controller may correct the set value of the target temperature using a quadratic curve.

(5) In the control device according to the aspect of the present invention, the controller may estimate a required time until the temperature of the target converges at the target temperature based on a shape of the quadratic curve, and the settling time and the dead time which are parameters of the control scheme and may start the control of the heating process at a time which is as late as possible within a time of a predetermined processable period.

(6) The control device according to the aspect of the present invention may further include a storage configured to store the control scheme.

(7) In the control device according to the aspect of the present invention, the heating process may be a process of heating the target with saturated steam. The control device may further include a measured data acquirer configured to acquire measured data of the temperature of the target from a temperature sensor that measures the temperature of the target, and a control signal outputter configured to output a control signal for controlling a degree of opening of a valve that adjusts an amount of the saturated steam to the valve.

(8) According to another aspect of the present invention, a control method is a method for a heating process which is a process of heating a target and does not include a cooling mechanism. The control method may be performed by a control device. The control method may include controlling a manipulation amount of the heating process such that a temperature of the target converges at a target temperature within a predetermined settling time without exceeding the target temperature based on a control scheme of modeling the heating process as a process including a dead time, a first-order lag, and an integration element and controlling the heating process by finite time settling control.

(9) In the control method according to the aspect of the present invention, the control scheme may include predetermined upper and lower limit constraints on the manipulation amount. The control method may further include controlling the manipulation amount of the heating process under the upper and lower limit constraints.

(10) The control method according to the aspect of the present invention may further include correcting a set value of the target temperature so that the set value gently increases to a final target value after the control of the heating process starts.

(11) The control method according to the aspect of the present invention may further include correcting the set value of the target temperature using a quadratic curve.

(12) The control method according to the aspect of the present invention may further include estimating a required time until the temperature of the target converges at the target temperature based on a shape of the quadratic curve, and the settling time and the dead time which are parameters of the control scheme, and starting the control of the heating process at a time which is as late as possible within a time of a predetermined processable period.

(13) The control method according to the aspect of the present invention may further include storing the control scheme into a storage.

(14) In the control method according to the aspect of the present invention, the heating process may be a process of heating the target with saturated steam. The control method may further include acquiring measured data of the temperature of the target from a temperature sensor that measures the temperature of the target, and outputting a control signal for controlling a degree of opening of a valve that adjusts an amount of the saturated steam to the valve.

(15) According to still another aspect of the present invention, a non-transitory computer readable storage medium may store a program executed by a computer. The program may be for a heating process which is a process of heating a target and does not include a cooling mechanism. The program may instruct the computer to control a manipulation amount of the heating process such that a temperature of the target converges at a target temperature within a predetermined settling time without exceeding the target temperature based on a control scheme of modeling the heating process as a process including a dead time, a first-order lag, and an integration element and controlling the heating process by finite time settling control.

(16) In the non-transitory computer readable storage medium according to the aspect of the present invention, the control scheme may include predetermined upper and lower limit constraints on the manipulation amount. The program may further instruct the computer to control the manipulation amount of the heating process under the upper and lower limit constraints.

(17) The non-transitory computer readable storage medium according to the aspect of the present invention may further instruct the computer to correct a set value of the target temperature so that the set value gently increases to a final target value after the control of the heating process starts.

(18) The non-transitory computer readable storage medium according to the aspect of the present invention may further instruct the computer to correct the set value of the target temperature using a quadratic curve.

(19) The non-transitory computer readable storage medium according to the aspect of the present invention may further instruct the computer to estimate a required time until the temperature of the target converges at the target temperature based on a shape of the quadratic curve, and the settling time and the dead time which are parameters of the control scheme, and start the control of the heating process at a time which is as late as possible within a time of a predetermined processable period.

(20) The non-transitory computer readable storage medium according to the aspect of the present invention may further instruct the computer to store the control scheme into a storage.

According to the present invention, it is possible to perform control such that a temperature of a target reaches a target temperature within a target time without overshooting even when parameters of a heating process which does not include a cooling mechanism are changed.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A control device for a heating process which is a process of heating a target and does not include a cooling mechanism, the control device comprising:
a controller configured to control a manipulation amount of the heating process based on a control scheme of modeling the heating process as a process including a dead time, a first-order lag, and an integration element and controlling the heating process by finite time settling control in which a temperature of the target converges at a target temperature within a predetermined settling time,
wherein the controller is configured to control the manipulation amount in accordance with a control calculation expression derived from a first transfer function, a second transfer function, and a third transfer function,
wherein the first transfer function receives a deviation between a set value of the target temperature and a control amount and outputs the manipulation amount,
wherein the second transfer function holds the manipulation amount output from the first transfer function, and
wherein the third transfer function receives the manipulation amount held by the second transfer function and outputs the control amount.

2. The control device according to claim 1,
wherein the control scheme includes predetermined upper and lower limit constraints on the manipulation amount, and
wherein the controller is configured to control the manipulation amount of the heating process under the upper and lower limit constraints.

3. The control device according to claim 2,
wherein the controller is configured to correct a set value of the target temperature so that the set value increases to a final target value after the control of the heating process starts.

4. The control device according to claim 3,
wherein the controller is configured to correct the set value of the target temperature using a quadratic curve.

5. The control device according to claim 4,
wherein the controller is configured to:
estimate a required time until the temperature of the target converges at the target temperature based on a shape of the quadratic curve, and the settling time and the dead time which are parameters of the control scheme; and
start the control of the heating process at a time which is as late as possible within a time of a predetermined processable period.

6. The control device according to claim 1, further comprising:
a storage configured to store the control scheme.

7. The control device according to claim 1,
wherein the heating process is a process of heating the target with saturated steam, and
wherein the control device further comprises:
a measured data acquirer configured to acquire measured data of the temperature of the target from a temperature sensor that measures the temperature of the target; and
a control signal outputter configured to output a control signal for controlling a degree of opening of a valve that adjusts an amount of the saturated steam to the valve.

8. A control method for a heating process which is a process of heating a target and does not include a cooling mechanism, the control method being performed by a control device, the control method comprising:
controlling a manipulation amount of the heating process based on a control scheme of modeling the heating process as a process including a dead time, a first-order lag, and an integration element and controlling the heating process by finite time settling control in which a temperature of the target converges at a target temperature within a predetermined settling time; and
controlling the manipulation amount in accordance with a control calculation expression derived from a first transfer function, a second transfer function, and a third transfer function,
wherein the first transfer function receives a deviation between a set value of the target temperature and a control amount and outputs the manipulation amount,
wherein the second transfer function holds the manipulation amount output from the first transfer function, and
wherein the third transfer function receives the manipulation amount held by the second transfer function and outputs the control amount.

9. The control method according to claim 8,
wherein the control scheme includes predetermined upper and lower limit constraints on the manipulation amount, and
wherein the control method further comprising:
controlling the manipulation amount of the heating process under the upper and lower limit constraints.

10. The control method according to claim 9, further comprising:
   correcting a set value of the target temperature so that the set value increases to a final target value after the control of the heating process starts.

11. The control method according to claim 10, further comprising:
   correcting the set value of the target temperature using a quadratic curve.

12. The control method according to claim 11, further comprising:
   estimating a required time until the temperature of the target converges at the target temperature based on a shape of the quadratic curve, and the settling time and the dead time which are parameters of the control scheme; and
   starting the control of the heating process at a time which is as late as possible within a time of a predetermined processable period.

13. The control method according to claim 8, further comprising:
   storing the control scheme into a storage.

14. The control method according to claim 8,
   wherein the heating process is a process of heating the target with saturated steam, and
   wherein the control method further comprises:
      acquiring measured data of the temperature of the target from a temperature sensor that measures the temperature of the target; and
      outputting a control signal for controlling a degree of opening of a valve that adjusts an amount of the saturated steam to the valve.

15. A non-transitory computer readable storage medium storing a program executed by a computer, the program being for a heating process which is a process of heating a target and does not include a cooling mechanism, the program instructing the computer to:
   control a manipulation amount of the heating process based on a control scheme of modeling the heating process as a process including a dead time, a first-order lag, and an integration element and controlling the heating process by finite time settling control in which a temperature of the target converges at a target temperature within a predetermined settling time, and
   control the manipulation amount in accordance with a control calculation expression derived from a first transfer function, a second transfer function, and a third transfer function,
   wherein the first transfer function receives a deviation between a set value of the target temperature and a control amount and outputs the manipulation amount,
   wherein the second transfer function holds the manipulation amount output from the first transfer function, and
   wherein the third transfer function receives the manipulation amount held by the second transfer function and outputs the control amount.

16. The non-transitory computer readable storage medium according to claim 15,
   wherein the control scheme includes predetermined upper and lower limit constraints on the manipulation amount, and
   wherein the program further instructs the computer to:
      control the manipulation amount of the heating process under the upper and lower limit constraints.

17. The non-transitory computer readable storage medium according to claim 16, wherein the program further instructs the computer to:
   correct a set value of the target temperature so that the set value increases to a final target value after the control of the heating process starts.

18. The non-transitory computer readable storage medium according to claim 17, wherein the program further instructs the computer to:
   correct the set value of the target temperature using a quadratic curve.

19. The non-transitory computer readable storage medium according to claim 18, wherein the program further instructs the computer to:
   estimate a required time until the temperature of the target converges at the target temperature based on a shape of the quadratic curve, and the settling time and the dead time which are parameters of the control scheme; and
   start the control of the heating process at a time which is as late as possible within a time of a predetermined processable period.

20. The non-transitory computer readable storage medium according to claim 15, wherein the program further instructs the computer to:
   store the control scheme into a storage.

* * * * *